(12) United States Patent
Kawada et al.

(10) Patent No.: US 6,478,919 B1
(45) Date of Patent: Nov. 12, 2002

(54) FUNCTIONAL FILM STICKING APPARATUS AND FUNCTIONAL FILM STICKING METHOD

(75) Inventors: Yasuo Kawada, Aichi (JP); Tsutomu Inose, Aichi (JP); Takashi Setsuda, Aichi (JP); Tatsuo Tanaka, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/576,913

(22) Filed: May 23, 2000

(30) Foreign Application Priority Data

Jun. 9, 1999 (JP) .............................. 11-162161

(51) Int. Cl.[7] .................. B32B 31/12; B32B 35/00; H01J 9/20
(52) U.S. Cl. .................. 156/249; 156/281; 156/535; 156/538; 156/574
(58) Field of Search .................. 156/247, 249, 156/281, 285, 535, 538, 539, 540, 541, 574

(56) References Cited

U.S. PATENT DOCUMENTS

| | | | |
|---|---|---|---|
| 3,944,461 A | | 3/1976 | Ogron |
| 5,092,954 A | * | 3/1992 | Braun et al. |
| 5,534,096 A | * | 7/1996 | Saito et al. |
| 5,653,837 A | * | 8/1997 | Tabuki et al. |
| 5,865,939 A | * | 2/1999 | Tabuki et al. |

FOREIGN PATENT DOCUMENTS

| | | |
|---|---|---|
| DE | 19835496 | 2/2000 |
| EP | 0271 621 | 6/1988 |
| GB | 2159763 | 12/1985 |
| JP | 8-287826 | * 11/1996 |
| JP | 9-306360 | * 11/1997 |
| JP | 10-199422 | * 7/1998 |
| JP | 10-225989 | * 8/1998 |
| JP | 11-11408 | * 1/1999 |
| JP | 11-20110 | * 1/1999 |
| JP | 11-185619 | * 7/1999 |
| JP | 11297201 | 10/1999 |
| JP | 11 297201 A | 10/1999 |
| WO | 99/17327 | * 4/1999 |

* cited by examiner

Primary Examiner—Curtis Mayes
(74) Attorney, Agent, or Firm—Sonnenschein, Nath & Rosenthal

(57) ABSTRACT

A functional film sticking apparatus includes: a separator peeling unit for peeling a separator from a functional film having the separator stuck on the functional film via an adhesive; a functional film sticking unit for sticking the functional film, from which the separator has been peeled by the separator peeling unit, on a panel surface; and a film fixing portion for carrying the functional film at least from the separator peeling unit to the functional film sticking unit while holding the functional film by suction, the film fixing portion being provided with a roller for sticking the functional film. The separator peeling unit is provided with a suction device for sucking, upon peeling the separator from the functional film, the atmosphere at the portion to be peeled and its neighborhood, or is provided with an electrostatic eraser for removing, upon peeling the separator from the functional film, electrostatic charges at the portion to be peeled and its neighborhood. With this apparatus, it is possible to reduce the entrapment of air and foreign matters upon sticking a functional film on a product and hence to improve the quality of the product on which the function film has been stuck.

10 Claims, 9 Drawing Sheets

FUNCTIONAL FILM STICKING APPARATUS AND FUNCTIONAL FILM STICKING METHOD

BACKGROUND OF THE INVENTION

The present invention relates to an apparatus and method for sticking a functional film having a reflection preventive function and the like on a panel surface of each of a CRT (Cathode-Ray Tube), various flat displays, and a filter used for a display.

A functional film for preventing the reflection and electrification, shielding unnecessary radiated electromagnetic waves, and the like has been stuck on a panel surface of each of a CRT and various flat displays. For example, the functional film having a reflection preventive function is produced by forming a multi-layer film having a layer structure of silicon oxide film/ITO (Indium Tin Oxide)/silicon oxide film/ITO/silicon oxide film on an optical film typically made from PET (polyethylene terephthalate) by a vacuum-vapor deposition process or a sputtering process.

The surface, on which a functional thin-film is not formed, of the functional film is coated with an adhesive, and a separator is formed to cover the adhesive by laminating.

The functional film is stuck on a panel surface by peeling the separator from the functional film to expose the adhesive; positioning the functional film to an objective panel surface; and sticking the functional film on the panel surface via the adhesive. In this case, the functional film is pressed by a roller to bring the functional film into close-contact with the panel surface.

Japanese Patent Laid-open No. Hei 11-297201 describes a film sticking apparatus having a function of preventing the so-called air entrapment significantly caused upon sticking a functional film on a large-sized panel surface, and a sticking method using the functional film sticking apparatus.

According to the related art apparatus and method for sticking a functional film, however, has the following inconvenience: namely, when a separator is peeled from the functional film, dust adhering on the separator and the like and chips adhering on the edges of the functional film and separator (for example, chips of a functional thin-film, a film substrate, an adhesive and the separator caused upon cutting of the functional film to a size of a display panel) are stuck on the adhesive and are entrapped between the functional film and the panel surface. The entrapment of foreign matters such as chips and dust degrades the display quality and also lowers the production yield of products each employing the functional film.

SUMMARY OF THE INVENTION

An object of the present invention is to provide a functional film sticking apparatus and a functional film sticking method, which are capable of solving the above-described problems.

To achieve the above object, according to the present invention, there is provided a functional film sticking apparatus including: a separator peeling unit for peeling a separator from a functional film having the separator stuck on the functional film via an adhesive; a functional film sticking unit for sticking the functional film, from which the separator has been peeled by the separator peeling unit, on a panel surface; and a film fixing portion for carrying the functional film at least from the separator peeling unit to the functional film sticking unit while holding the functional film by suction, the film fixing portion being provided with a roller for sticking the functional film. The separator peeling unit is provided with a suction device for sucking, upon peeling the separator from the functional film, the atmosphere at the portion to be peeled and its neighborhood, or is provided with an electrostatic erasing device for removing, upon peeling the separator from the functional film, electrostatic charges at the portion to be peeled and its neighborhood.

With this configuration, since the separator peeling unit for separating a separator from a functional film is provided with the suction device for sucking the atmosphere at the portion to be peeled and its neighborhood or an electrostatic erasing device for removing electrostatic charges at the portion to be peeled and its neighborhood, it is possible to suck chips and dust scattered upon peeling the separator by the suction device or prevent the adhesion of chips and dust due to electrification by the electrostatic erasing device, and hence to prevent the adhesion of the chips and dust on the adhesive of the functional film after the separator is peeled from the functional film.

According to the present invention, there is also provided a functional film sticking method including the steps of: peeling a separator from a functional film having the separator stuck on the functional film via an adhesive while holding the functional film by a film fixing portion; and carrying the functional film, from which the separator has been peeled, to a position over the panel surface by movement of the film fixing portion, and sticking the functional film on the panel surface by the pressing force of a roller provided on the film fixing portion; wherein the step of peeling the separator is performed while the atmosphere at the portion to be peeled and its neighborhood is sucked, or the step of peeling the separator is performed while electrostatic charges at the portion to be peeled and its neighborhood is removed.

With this configuration, since a separator is peeled from a functional film while the atmosphere at the portion to be peeled and its neighborhood is sucked or electrostatic charges at the portion to be peeled and its neighborhood is removed, it is possible to suck chips. and dust scattered upon peeling the separator by the suction device or prevent the adhesion of chips and dust due to electrification by the electrostatic erasing device, and hence to prevent the adhesion of the chips and dust on the adhesive of the functional film after the separator is peeled from the functional film.

DETAILED DESCRIPTION OF THE PREFERRED EMBODIMENTS

Figure 1:
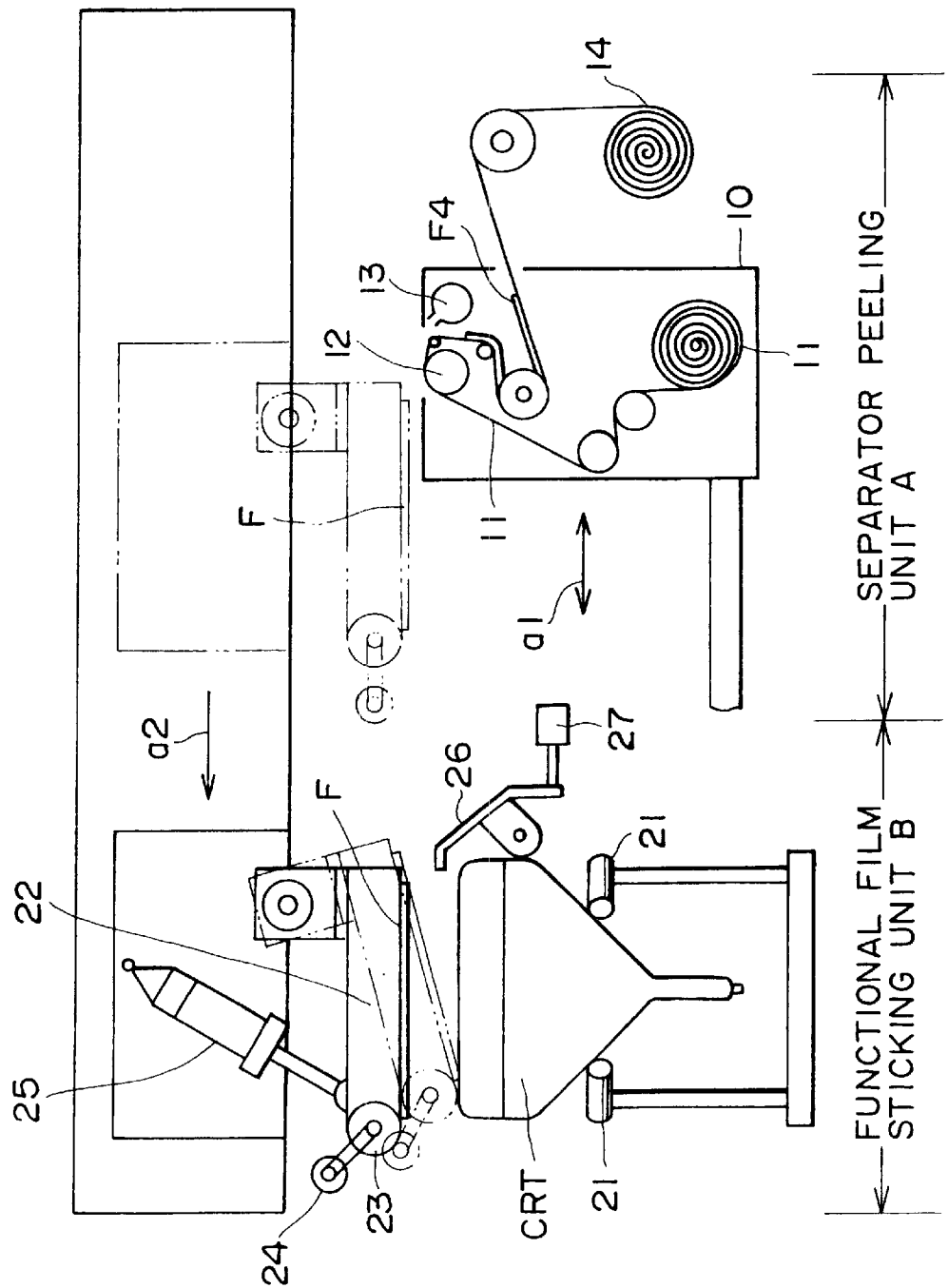
FIG. 1 is a schematic view illustrating a functional film sticking apparatus according to the present invention.
Figure 2:
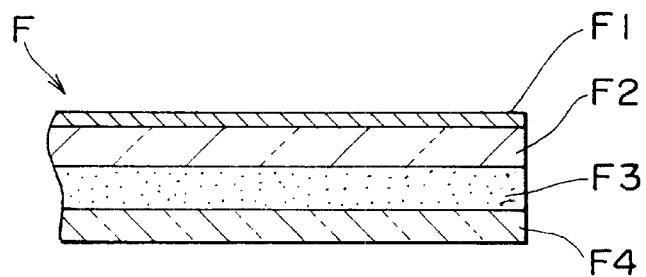
FIG. 2 is a partial sectional view illustrating a functional film.

Hereinafter, embodiments of a functional film sticking apparatus and a functional film sticking method of the present invention will be described with reference to the drawings. FIG. 1 is a schematic view illustrating a functional film sticking apparatus in this embodiment; and FIG. 2 is a partial sectional view illustrating a functional film used in the apparatus of the present invention. First, a configuration of the functional film F will be described with reference to FIG. 2.

The functional film F includes a film substrate F2 configured as an optical film made from PET (polyethylene terephthalate), and a functional thin-film F1 having a reflection preventive function, an anti-static function, electromagnetic shielding function, and the like, which is formed on the film substrate F2. For example, the functional thin-film F1 having a reflection preventive function is composed of a multi-layer film having a layer structure of silicon oxide film/ITO (Indium Tin Oxide)/silicon oxide film/ITO/silicon oxide film.

An adhesive F3 is applied on the surface, opposed to the surface on which the functional thin-film F1 is formed, of the film substrate F2, and is covered with a separator F4. In the case of sticking the functional film F on the surface of a panel, the separator F4 is peeled to expose the adhesive F3, and the functional film F is stuck on the panel surface by the adhesive force of the adhesive F3.

The functional film F is obtained by continuously forming the functional thin-film F1, adhesive F3 and separator F4 on the long-sized film substrate F2, and is then cut into a specific sticking size (for example, corresponding to the size of a panel surface). Chips and dust occur at the above cutting step and adhere on the peripheral edge and the surface of the functional film F, and if the chips and dust are scattered, they may obstruct the sticking of the functional film F on a panel surface. The apparatus and method for sticking the functional film F according to this embodiment are characterized by preventing the scattering of the above chips and dust and the adhesion thereof on a panel surface.

The apparatus for sticking the functional film F according to this embodiment will be described with reference to FIG. 1. Referring to FIG. 1, the sticking apparatus basically includes a separator peeling unit A having a function of peeling the separator F4 adhering on the functional film F, and a functional film sticking unit B having a function of sticking the functional film, from which the separator F4 has been peeled, on the panel surface of a CRT or the like.

The separator peeling unit A includes a peeling machine main body 10, a peeling tape 11, a peeling roller 12, a suction device 13, and a winding roller 14. The separator peeling unit A is reciprocally movable along the direction shown by an arrow a1 in FIG. 1. During forward movement of the separator peeling unit A, the peeling roller 12 around which the peeling tape 11 is wound is rolled on the surface of the separator F4 of the functional film F, to peel the separator F4 from the functional film F by the adhesive force of the peeling tape 11. The separator F4 thus peeled is withdrawn in the peeling machine main body 10 and is wound around the winding roller 14.

In particular, the sticking apparatus according to this embodiment includes the suction device 13 for sucking, upon peeling the separator F4 from the functional film F by movement of the peeling machine main body 10, the atmosphere at the portion to be peeled and its neighborhood. The suction device 13 typically makes use of the sucking function of a turbofan provided with a hose extending therefrom. To be more specific, upon peeling of the separator F4, the suction device 13 makes the atmospheric pressure at the portion to be peeled and its neighborhood lower than that at other portions, to suck chips and dust scattering at the portion to be peeled and its neighborhood, thereby preventing the adhesion of the chips and dust on the adhesive portion of the functional film F from which the separator F4 has been peeled.

Figure 7:
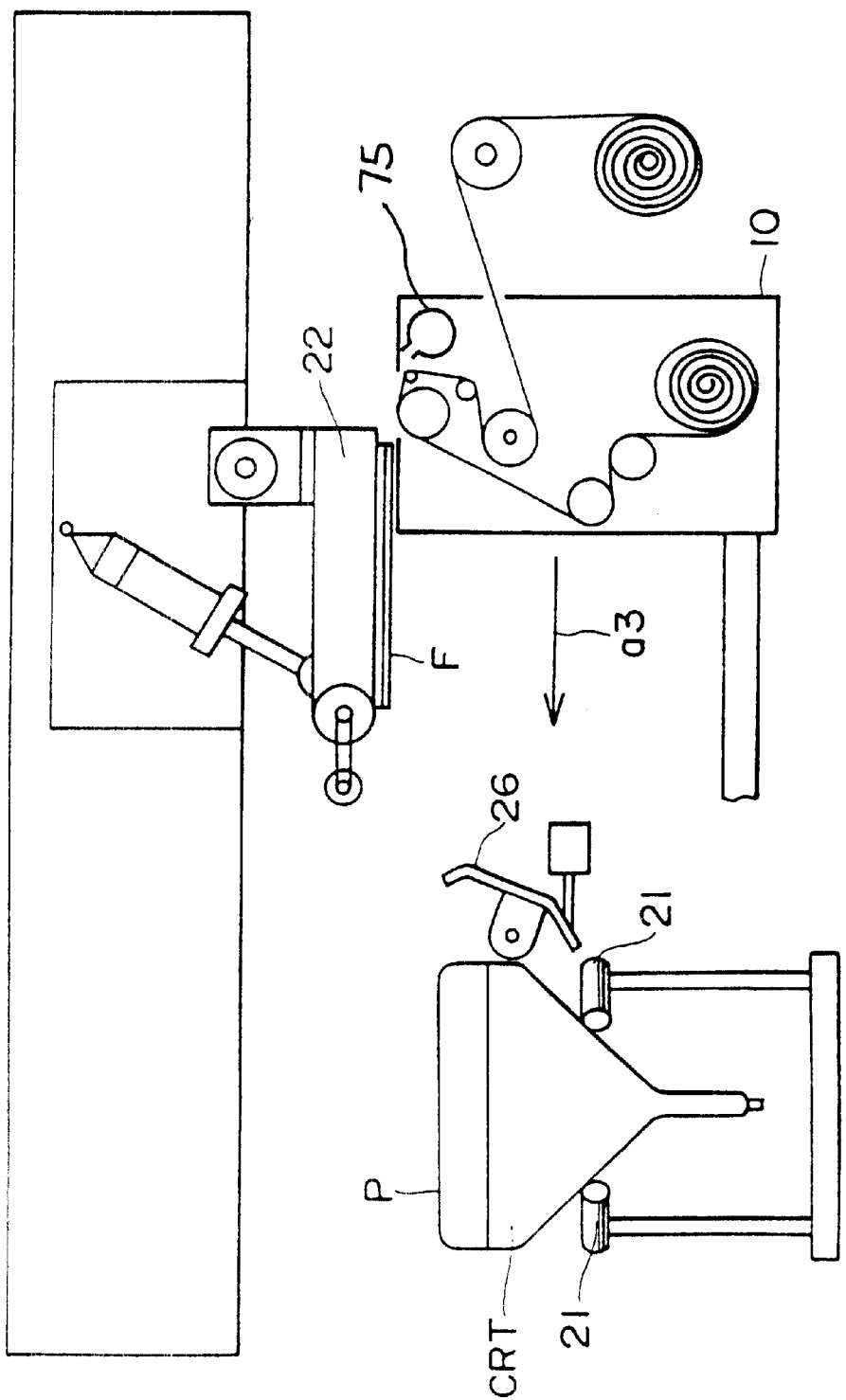
FIG. 7 is a schematic view illustrating a step of a functional film sticking method.

In place of the suction device 13, or in co-operation with the suction device 13, an electrostatic eraser, typically, an electrostatic erasing blower 75, as shown in FIG. 7, may be used for removing electrostatic charges at the portion from which the separator F4 is to be peeled and its neighborhood. Upon peeling the separator F4, electrostatic charges of +4 to +12 kV occur on the adhesive F3 side, and electrostatic charges of −4 to −12 kV occur on the separator F4 side. Accordingly, by removing these electrostatic charges by means of the electrostatic eraser, it is possible to more effectively prevent the adhesion of chips and dust on the functional film F.

Figure 3:
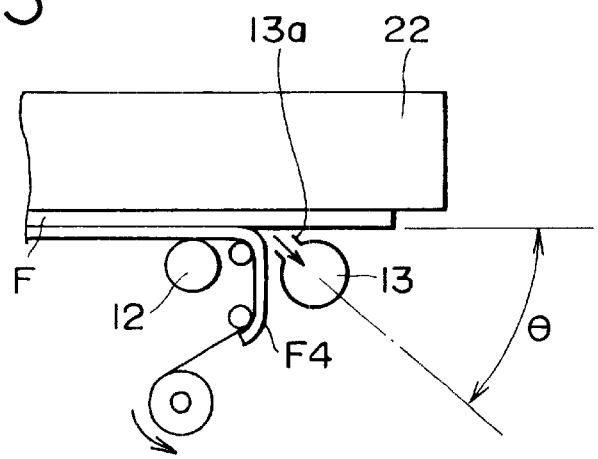
FIG. 3 is a partial schematic view illustrating a suction device.

FIG. 3 is a partial schematic view illustrating the suction device. The suction device 13 is disposed in the vicinity of the peeling roller 12 for peeling the separator F4 from the functional film F. The suction device 13 has a nozzle 13a taken as a suction port. The nozzle 13a may be configured as a plurality of nozzles, or a nozzle including an elongated suction port, for example, having a length corresponding to the width of the separator F4.

If the suction device 13 comes excessively close to the functional film F, the nozzle 13a of the suction device 13 may come in contact with the adhesive of the functional film F by vibration caused upon movement of the peeling machine main body 10 (see FIG. 1). On the contrary, if the suction device 13 is separated excessively apart from the functional film F, the dust sucking ability of the suction device 13 is degraded. With respect to the tilt angle of the nozzle 13a, it is revealed from the experimental result that the suction device 13 can efficiently suck chips and dust when the nozzle 13a is tilted at an angle θ which is set at about a half of a peeling angle (90° in this embodiment) of the separator F4 with respect to the functional film F.

Accordingly, it may be desirable to dispose the suction device 13 such that the nozzle 13a of the suction device 13 is spaced apart from the functional film F by a distance from 1 mm to 5 mm and the tilt angle θ is set at about 45°±15° with respect to the direction along which the functional film F is held. With such disposition of the suction device 13, even if chips and dust occur upon peeling the separator F4, they can be certainly sucked by the suction device 13 before scattered at the portion to be peeled and its neighborhood.

The functional film sticking unit B will be described below. Referring to FIG. 1, the functional film sticking unit B includes a holder 21 for fixing a CRT with its panel surface directed upwardly; a film fixing plate 22 for holding the functional film F typically by suction; a main roller 23 mounted at an end portion of the film fixing plate 22; a cleaning roller 24 vertically movably mounted to an arm mounted to an axial end of the main roller 23; a movable cylinder 25 for adjusting a supporting angle of the film fixing plate 22; a film receiver 26 for receiving the trailing end of the functional film F when the functional film F is stuck on the panel surface; and a damper 27 for damping vibration caused upon movement of the film receiver 26.

The film fixing plate 22 is moved in the direction shown by an arrow a2 in FIG. 1 from the separator peeling unit A to a position over the panel surface of the CRT while holding the functional film F. The main roller 23 mounted to the one end of the film fixing plate 22 is used for pressing the functional film F held by the film fixing plate 22 on the panel surface of the CRT.

Figure 4A:
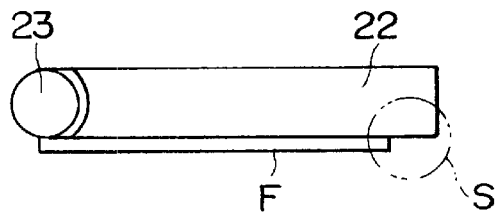
FIG. 4A is a side view of a film fixing plate.
Figure 4B:
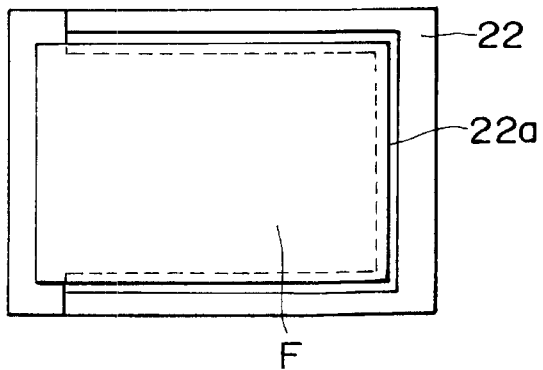
FIG. 4B is a bottom view of the film fixing plate.
Figure 5:
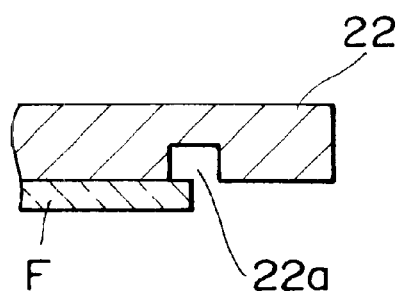
FIG. 5 is an enlarged sectional view of an S portion shown in FIG. 4A.

FIG. 4A is a side view of the film fixing plate and FIG. 4B is a bottom view of the film fixing plate. FIG. 5 is an enlarged sectional view of an S portion shown in FIG. 4A. Referring to FIG. 5, the functional film sucking and holding surface of the film fixing plate 22 in this embodiment has a groove 22a extending along a line corresponding to the peripheral edge of the functional film F held by suction on the functional film sucking and holding surface of the film fixing plate 22.

Referring to FIGS. 1 and 2, when the separator F4 is peeled from the functional film F which is pressed by the peeling roller 12 (see FIG. 1), the adhesive F3 of the functional film F may be extruded by the pressing force to adhere on the functional film sucking and holding surface of the film fixing plate 22. The adhesive thus extruded onto the functional film sucking and holding surface of the film fixing plate 22 may cause, at the next step of holding the functional film F by suction, contamination and/or degradation of the positioning accuracy of the functional film F. The provision of the groove 22a allows the extruded adhesive F3 to be escaped in the groove 22a, to prevent the transfer of the extruded adhesive on the next functional film F, thereby preventing degradation of the positioning accuracy of the next functional film F.

Figure 6:
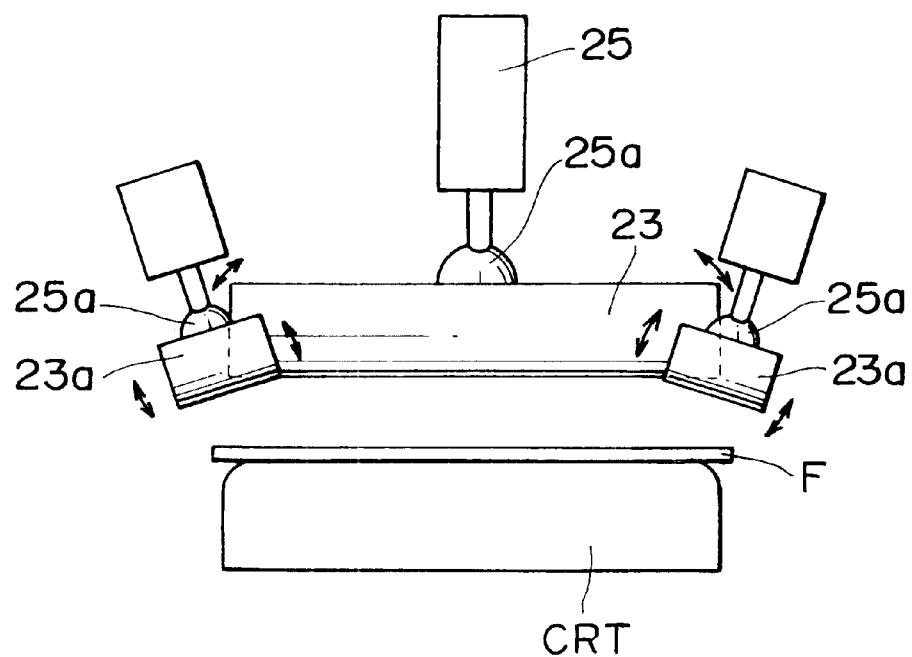
FIG. 6 is a schematic front view illustrating a main roller and its associated components.

FIG. 6 is a schematic front view illustrating the main roller and its associated components. The main roller 23 in this embodiment is used for pressing a central portion of the panel surface of a CRT so as to stick the functional film F on the panel surface of the CRT. Side rollers 23a are provided on both sides of the main roller 23. The side rollers 23a are used for pressing a curved edge portion of the panel surface of the CRT so as to bring the peripheral edge of the functional film F into close-contact with the curved edge portion of the panel surface of the CRT. In addition, the side rollers 23a are desired to be previously tilted at an angle matched to the curved edge portion of the panel surface.

According to this embodiment, a supporting portion of each of the main roller 23 and the side rollers 23a has an equalizing mechanism 25a for allowing the roller to follow the panel surface. Even if the panel surface of the CRT is somewhat tilted, the main roller 23 and the side rollers 23a can equally impart a pressing pressure on the panel surface by the actions of the equalizing mechanisms 25a, to thereby certainly stick the functional film F on the panel surface.

Referring again to FIG. 1, when the film fixing plate 22 is moved from the separator peeling unit A in the direction shown by the arrow a2 in this figure, the cleaning roller 24 vertically movably mounted to the arm mounted to the axial end of the main roller 23 is positioned under the main roller 23 and is rolled on the panel surface of the CRT along with the movement of the film fixing plate 22. With this action of the cleaning roller 24, it is possible to remove dust and the like from the panel surface directly before the functional film F is stuck on the panel surface, and hence to stick the functional film F on the panel surface thus cleaned by the cleaning roller 24.

The film receiver 26 for receiving the trailing end of the functional film F when the functional film F is stuck on the panel surface is provided with the damper 27 for damping vibration caused upon movement of the film receiver 26. When the functional film F is stuck on the panel surface by the main roller 23 and the like, the trailing end of the functional film F is strongly touched to the panel surface by the elastic force of the functional film F, thereby causing entrapment of air between the functional film F and the panel surface. To cope with such an inconvenience, the film receiver 26 is provided. To be more specific, the trailing end of the functional film F is lightly touched to the film receiver 26 before stuck on the panel surface.

Since the trailing end of the functional film F is touched to the film receiver 26 as described above, the adhesive F3 of the functional film F (see FIG. 2) adheres on the tip of the film receiver 26. If the film receiver 26 is moved forward and backward, the adhesive F3 is removed from the tip of the film receiver 26 to be dropped on the panel surface by vibration of the film receiver 26. According to this embodiment, the vibration caused by movement forward and backward of the film receiver 26 can be damped by the damper 27 provided on the film receiver 26, to thereby prevent the adhesive F3 from being dropped on the panel surface.

The film receiver 26 may be provided with a mechanism (not shown) movable in the height direction for adjusting a distance between the tip of the film receiver 26 and the panel surface of the CRT. With the provision of the movable mechanism, even if there occurs a variation in arrangement position of the panel surface of the CRT, it is possible to eliminate the variation in arrangement position of the panel surface of the CRT by the movable mechanism and hence to usually, certainly carry out the film receiving action of the film receiver 26.

The functional film sticking method according to this embodiment will be described below. FIGS. 7 to 12 are schematic views illustrating the functional film sticking method in this embodiment in sequence. Referring first to FIG. 7, a CRT is fixed by the holder 21 with a panel surface P directed upwardly. At this time, the film receiver 26 is located apart from the CRT. The functional film F is positioned to the film fixing plate 22 and the functional thin-film F1 side of the functional film F (see FIG. 2) is held on the film fixing plate 22 by suction. Then, the peeling machine main body 10 is moved in the direction shown by an arrow a3 in FIG. 7.

Figure 8:
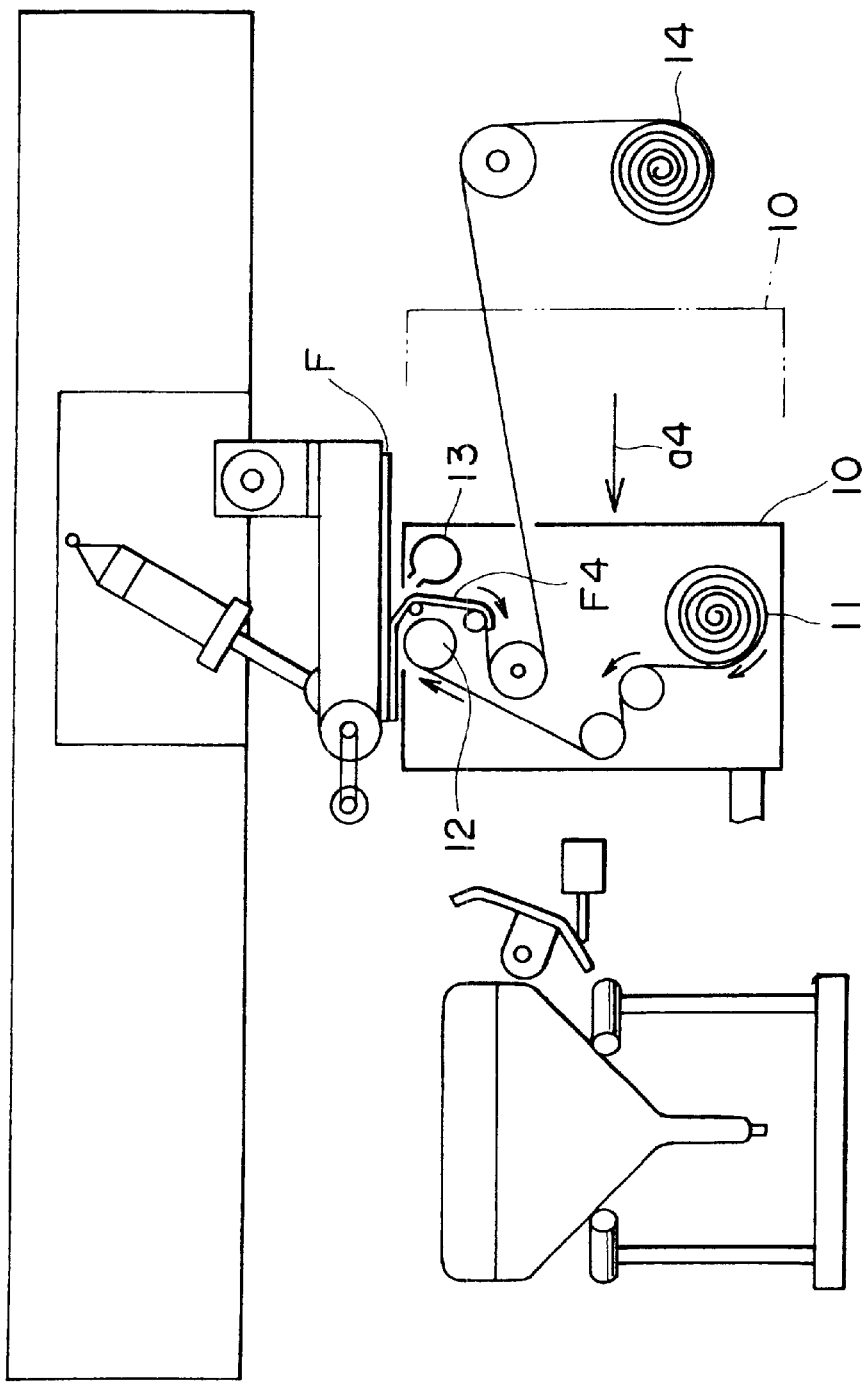
FIG. 8 is a schematic view illustrating a step of the functional film sticking method, continued from the step shown in FIG. 7.

Referring to FIG. 8, as the peeling machine main body 10 is moved in the direction shown by an arrow a4 (corresponding to the arrow a3 in FIG. 7), the peeling roller 12 is rolled while pressing the separator F4 of the functional film F, to press the peeling tape 11 onto the separator F4, thereby peeling the separator F4 by the adhesive force of the peeling tape 11. At this time, the rotation of the winding roller 14 is stopped, so that the peeling tape 11 is sequentially fed to the peeling roller 12 along with the movement of the peeling machine main body 10. The separator F4 thus peeled is withdrawn, together with the peeling tape 11, into the peeling machine main body 10.

At the above step of peeling the separator F4, the suction device 13 is operated to suck the atmosphere at the portion to be peeled and its neighborhood. This makes it possible to suck chips and dust caused by peeling of the separator F4 and hence to prevent the adhesion of the chips and dust on the functional film F from which the separator F4 has been peeled. Additionally, in place of the suction device 13, or in co-operation with the suction device 13, an electrostatic eraser (not shown) may be used for preventing the adhesion of dust and the like due to electrostatic charges caused upon peeling the separator F4.

Figure 9:
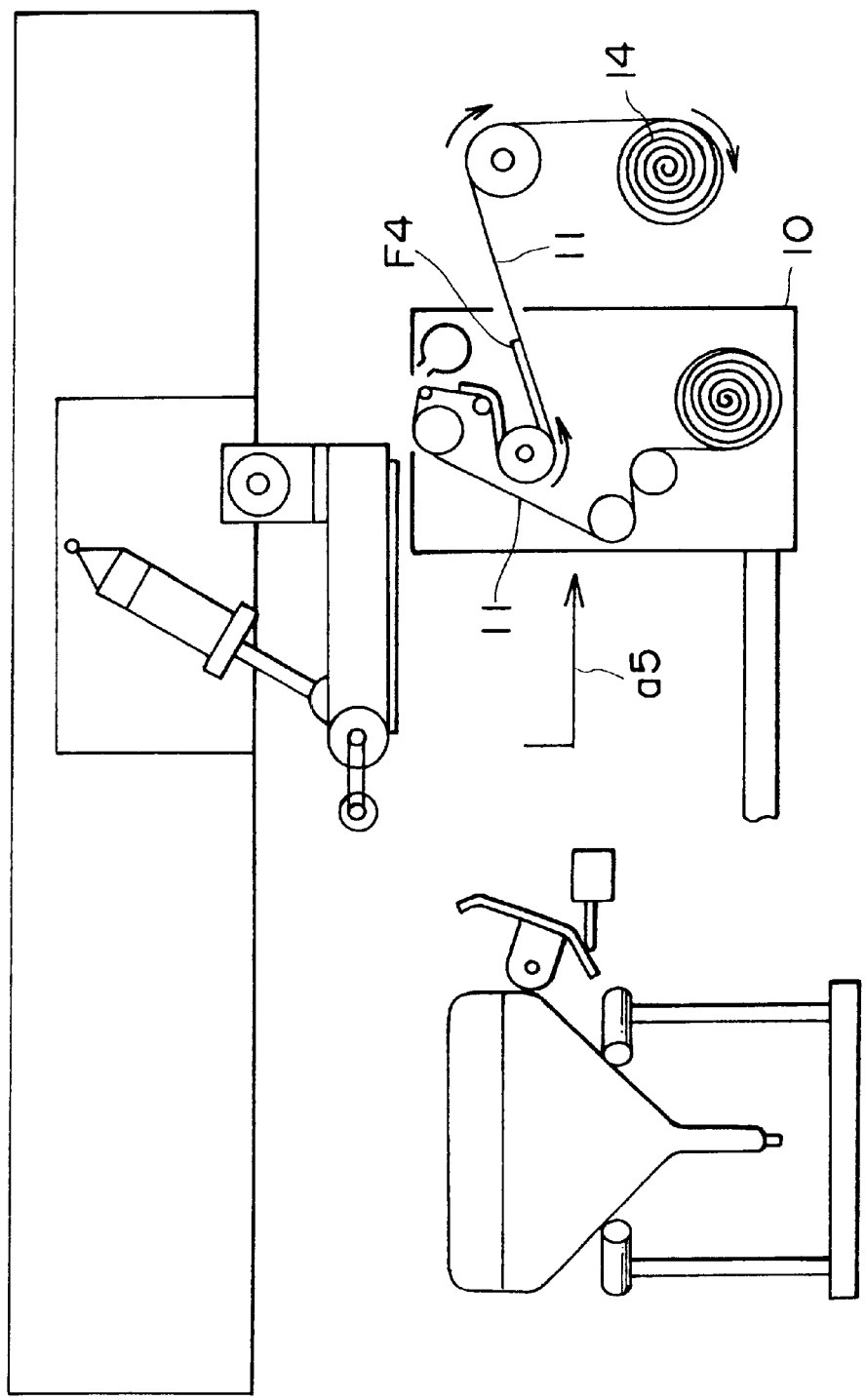
FIG. 9 is a schematic view illustrating a step of the functional film sticking method, continued from the step shown in FIG. 8.

Referring to FIG. 9, after removal of the separator F4, the peeling machine main body 10 is once moved down and is returned to the original position as shown by an arrow a5 in this figure. At this time, the winding roller 14 is rotated to sequentially wind the separator F4, which adheres on the peeling tape 11 withdrawn in the peeling machine main body 10, to the winding roller 14 side.

Figure 10:
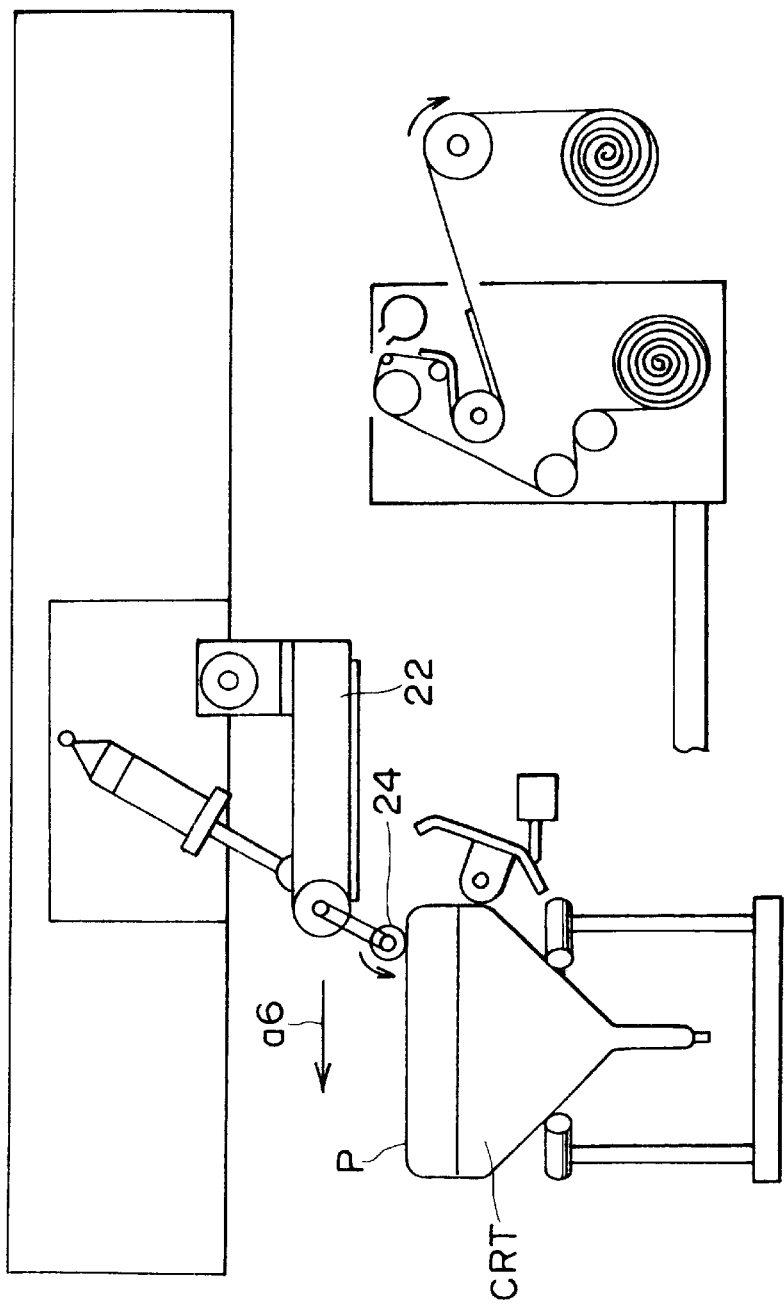
FIG. 10 is a schematic view illustrating a step of the functional film sticking method, continued from the step shown in FIG. 9.

Referring to FIG. 10, the film fixing plate 22 is moved in the direction shown by an arrow a6 in this figure. At this time, the cleaning roller 24 is moved down to the height of the panel surface P of the CRT, to clean the panel surface P along with the movement of the film fixing plate 22, thereby removing dust and the like adhering on the panel surface of the CRT.

Figure 11:
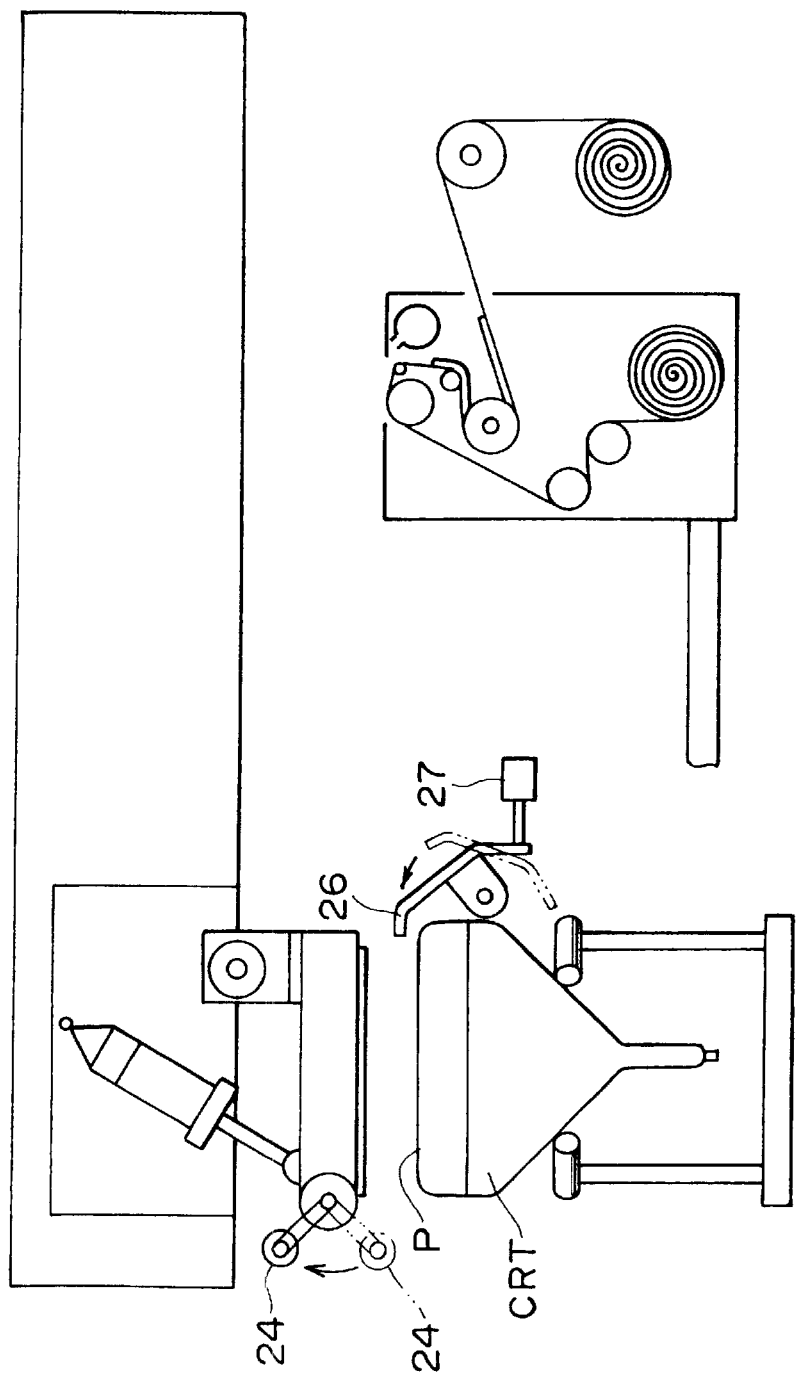
FIG. 11 is a schematic view illustrating a step of the functional film sticking method, continued from the step shown in FIG. 10.

Referring to FIG. 11, the cleaning roller 24 is jumped up to be escaped from the CRT, and simultaneously the film receiver 26 is moved to the CRT side. At this time, since vibration caused by movement of the film receiver 26 is damped by the damper 27, the adhesive and dust adhering on the film receiver 26 are prevented from being dropped on the panel surface P of the CRT.

Figure 12:
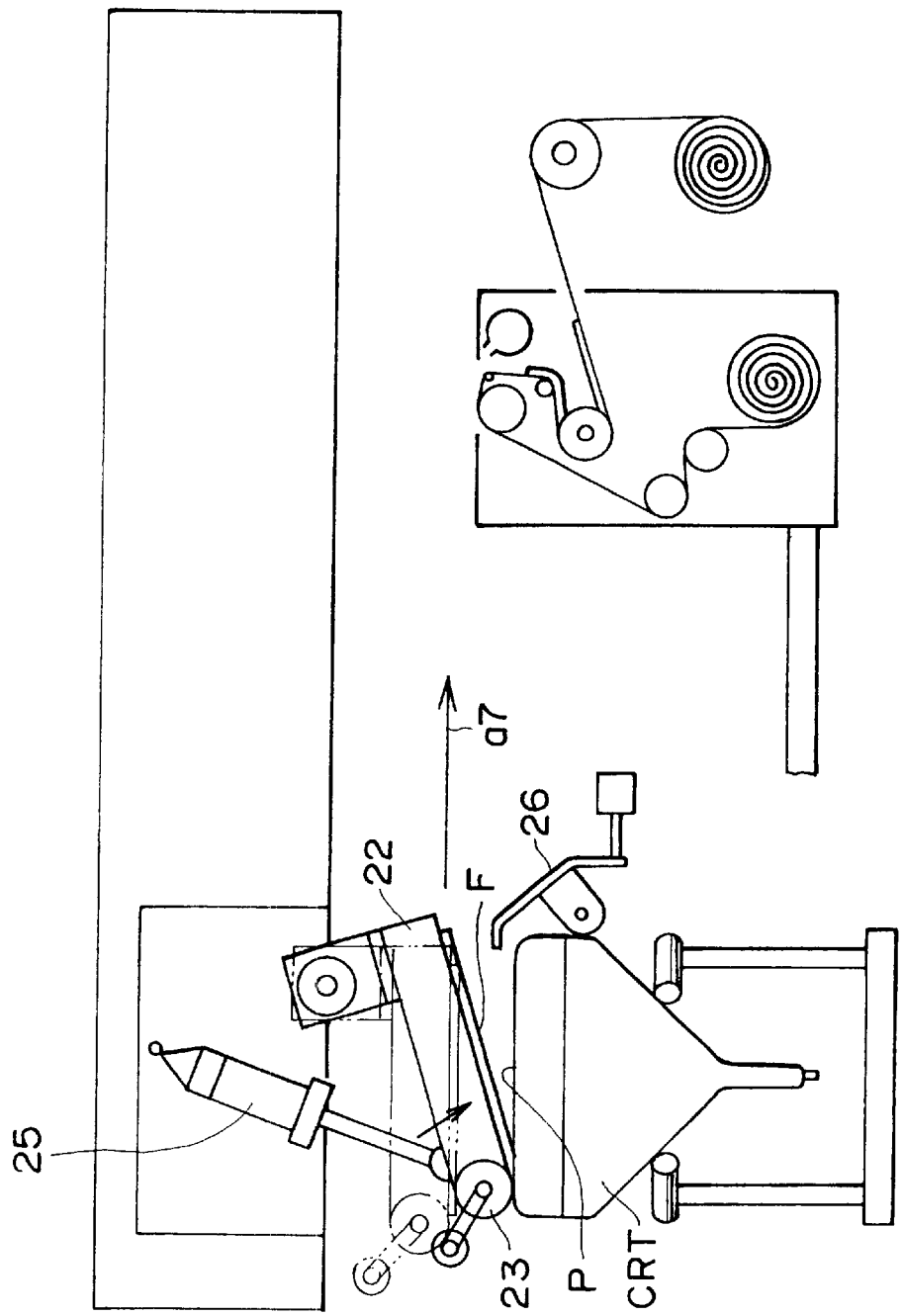
FIG. 12 is a schematic view illustrating a step of the functional film sticking method, continued from the step shown in FIG. 11.

The operation to stick the functional film F on the panel surface P of the CRT is shown in FIG. 12. Referring to FIG. 12, the film fixing plate 22 is tilted by expanding the movable cylinder 25, and one end (film edge) of the functional film F is pressed on the panel surface P of the CRT by the main roller 23. At this time, since the cleaning roller 24 (see FIG. 11) is previously jumped up, the functional film F does not interfere with the cleaning roller 24 when pressed by the main roller 23.

In such a state, the film fixing plate 22 is moved in the direction shown by an arrow a7 in FIG. 12, whereby the main roller 23 is rolled to press and stick the functional film F sequentially from one end to the other end on the panel surface P of the CRT. Since the main roller 23 and the side rollers 23a shown in FIG. 6 are provided with the equalizing mechanisms 25a described above, they can certainly press the functional film F on the panel surface of the CRT while following the panel surface P of the CRT.

When the other end of the functional film F is stuck on the panel surface P of the CRT, it is once touched to the tip of the film receiver 26, and then removed therefrom to be stuck on the panel surface P by the pressure of the forwardly moving main roller 23. That is to say, the other end of the functional film F is stuck on the panel surface P with a time lag caused by the action thereof to be touched to and removed from the tip of the film receiver 26. This makes it possible to prevent the other end of the functional film F to be abruptly stuck by the elastic force of the functional film F, and hence to stick the other end of the functional film F without occurrence of entrapment of air between the functional film F and the panel surface P.

In this way, according to the method of sticking the functional film F on the panel surface P by the functional film sticking apparatus, the functional film F can be certainly stuck on the panel surface P without occurrence of the inconveniences, for example, the adhesion of foreign matters such as chips and dust and the entrapment of air between the panel surface P and the functional film F, and the like, during the processing steps from the step of peeling the separator F4 to the step of sticking the functional film F.

While the sticking of the functional film F on the panel surface of a CRT has been described in the above-described embodiment, the present invention is not limited thereto but may be applied to the sticking of the functional film F on the panel surface of a flat display such as a liquid crystal display, plasma display or a plasma addressed display, or the panel surface of an OA filter or the like.

As described above, the functional film sticking apparatus and the functional film sticking method according to the present invention exhibit the following effects; namely, it is possible to enhance the quality of a product on which a functional film is stuck by reducing, in the case of sticking the functional film on the panel surface, the entrapment of air and foreign matters as much as possible, and to reduce a failure due to adhesion of foreign matters on the product on which the functional film is mounted, and hence to significantly improve the production yield.

While the preferred embodiments of the present invention has been described using the specific terms, such description is for illustrative purposes only, and it is to be understood that changes and variations may be made without departing from the spirit or scope of the following claims.

What is claimed is:

1. A functional film sticking apparatus comprising:

a separator peeling unit for peeling a separator from a functional film having the separator stuck on the functional film via an adhesive;

a functional film sticking unit for sticking the functional film, from which the separator has been peeled by said separator peeling unit, on a panel surface; and a film fixing portion for carrying the functional film at least from said separator peeling unit to said functional film sticking unit while holding the functional film by suction, said film fixing portion being provided with a roller for sticking the functional film;

wherein said separator peeling unit is provided with a suction device for sucking, upon peeling the separator from the functional film, the atmosphere at the portion to be peeled and its neighborhood.

2. A functional film sticking apparatus comprising:

a separator peeling unit for peeling a separator from a functional film having the separator stuck on the functional film via an adhesive;

a functional film sticking unit for sticking the functional film, from which the separator has been peeled by said separator peeling unit, on a panel surface; and a film fixing portion for carrying the functional film at least from said separator peeling unit to said functional film sticking unit while holding the functional film by suction, said film fixing portion being provided with a roller for sticking the functional film;

wherein said separator peeling unit is provided with an electrostatic erasing device for removing, upon peeling the separator from the functional film, electrostatic charges at the portion to be peeled and its neighborhood.

3. A functional film sticking apparatus according to claim 1 or 2, wherein the functional film sucking and holding surface of said film fixing portion has a groove along a line which corresponds to the peripheral edge of the functional film held by suction on said functional film sucking and holding surface of said film fixing portion.

4. A functional film sticking apparatus according to claim 1 or 2, further comprising: cleaning means moved together with said film fixing portion for cleaning the panel surface before the functional film is stuck on the panel surface.

5. A functional film sticking apparatus according to claim 1 or 2, wherein a supporting portion of said roller of said film fixing portion is provided with an equalizing mechanism for allowing said roller to follow the panel surface.

6. A functional film sticking apparatus according to claim 5, wherein said roller comprises a main roller for pressing a central portion of the panel surface and a sub-roller for pressing the peripheral edge portion of the panel surface, and said equalizing mechanism is provided on each of said main roller and said sub-roller.

7. A functional film sticking apparatus according to claim 1 or 2, said film fixing portion is provided with a film receiver for receiving the sticking rear end of the functional film, said film receiver being provided with a damping device for damping vibration caused by forward and backward movement of said film receiver.

8. A functional film sticking method comprising the steps of:
   peeling a separator from a functional film having the separator stuck on the functional film via an adhesive while holding the functional film by a film fixing portion; and
   carrying the functional film, from which the separator has been peeled, to a position over a panel surface by movement of the film fixing portion, and sticking the functional film on the panel surface by the pressing force of a roller provided on the film fixing portion;
   wherein said step of peeling the separator is performed while the atmosphere at the portion to be peeled and its neighborhood is sucked.

9. A functional film sticking method comprising the steps of:
   peeling a separator from a functional film having the separator stuck on the functional film via an adhesive while holding the functional film by a film fixing portion; and
   carrying the functional film, from which the separator has been peeled, to a position over a panel surface by movement of the film fixing portion, and sticking the functional film on the panel surface by the pressing force of a roller provided on the film fixing portion;
   wherein said step of peeling the separator is performed while electrostatic charges at the portion to be peeled and its neighborhood is removed.

10. A functional film sticking method according to claim 8 or 9, further comprising the step of cleaning the panel surface, prior to sticking the functional film on the panel surface.

* * * * *